(12) United States Patent
Quanshan et al.

(10) Patent No.: US 10,407,906 B2
(45) Date of Patent: Sep. 10, 2019

(54) PVC BOARD AND METHOD OF MANUFACTURE

(71) Applicant: Jiangsu Poptop New Decoration Material Co., Ltd., Taizhou, Jiangsu Province (CN)

(72) Inventors: Cheng Quanshan, Taizhou (CN); Xue Genxiang, Taizhou (CN); Yuan Jun, Taizhou (CN)

(73) Assignee: JIANGSU POPTOP NEW DECORATION MATERIAL CO., LTD, Taizhou, Jiangsu Province (CN)

( * ) Notice: Subject to any disclaimer, the term of this patent is extended or adjusted under 35 U.S.C. 154(b) by 0 days.

(21) Appl. No.: 15/074,024

(22) Filed: Mar. 18, 2016

(65) Prior Publication Data

US 2016/0200034 A1    Jul. 14, 2016

(30) Foreign Application Priority Data

Dec. 3, 2015    (CN) .............................. 2015 1 086205

(51) Int. Cl.
*E04C 2/20*    (2006.01)
*E04C 2/24*    (2006.01)
(Continued)

(52) U.S. Cl.
CPC ............ *E04C 2/205* (2013.01); *B29C 48/002* (2019.02); *B29C 48/0011* (2019.02); *B29C 48/0022* (2019.02); *B29C 48/21* (2019.02); *B32B 5/18* (2013.01); *B32B 5/20* (2013.01); *B32B 27/065* (2013.01); *B32B 27/08* (2013.01); *B32B 27/18* (2013.01); *B32B 27/304* (2013.01); *E04C 2/24* (2013.01); *E04F 15/105* (2013.01);
(Continued)

(58) Field of Classification Search
CPC ................... E04C 2/20–246; E04F 15/105; E04F 15/107; B32B 5/18; B32B 5/20; B32B 27/065
See application file for complete search history.

(56) References Cited

U.S. PATENT DOCUMENTS 5,466,317 A * 11/1995 Lause ................. B29C 37/0082
156/244.11
6,139,945 A * 10/2000 Krejchi .................... B32B 5/18
428/317.9
(Continued)

FOREIGN PATENT DOCUMENTS

CN    103865208 A  *  6/2014  ............... B32B 3/26
CN    104070710 A  *  10/2014
(Continued)

OTHER PUBLICATIONS

Machine translation of CN 104070710 A, obtained using Google Patent on Jun. 16, 2017.*
(Continued)

*Primary Examiner* — Z. Jim Yang
(74) *Attorney, Agent, or Firm* — Drinker Biddle & Reath LLP

(57) ABSTRACT

A novel PVC board and method of manufacture. The board includes a flexible PVC impact modifier instead of a plasticizer to provide resilient flooring with improved performance. The method of manufacture simplifies the production process, and improves production time and efficiency.

14 Claims, 2 Drawing Sheets

(51) Int. Cl.
    *B32B 27/30*     (2006.01)
    *B29C 48/21*     (2019.01)
    *B32B 5/20*     (2006.01)
    *E04F 15/10*     (2006.01)
    *B32B 5/18*     (2006.01)
    *B32B 27/06*     (2006.01)
    *B32B 27/08*     (2006.01)
    *B32B 27/18*     (2006.01)
    *B29C 48/00*     (2019.01)
    *B29K 27/06*     (2006.01)
    *B29K 509/00*     (2006.01)
    *B29L 9/00*     (2006.01)

(52) U.S. Cl.
    CPC ........ *E04F 15/107* (2013.01); *B29K 2027/06* (2013.01); *B29K 2509/00* (2013.01); *B29L 2009/00* (2013.01); *B32B 2266/0235* (2013.01); *B32B 2307/406* (2013.01); *B32B 2307/412* (2013.01); *B32B 2307/538* (2013.01); *B32B 2307/546* (2013.01); *B32B 2307/558* (2013.01); *B32B 2471/00* (2013.01)

(56) References Cited

U.S. PATENT DOCUMENTS

| | | | | |
|---|---|---|---|---|
| 2009/0029107 | A1* | 1/2009 | Montiel | B29C 44/20 428/142 |
| 2013/0230687 | A1* | 9/2013 | Chen | B32B 27/08 428/116 |
| 2014/0227484 | A1* | 8/2014 | Sung | B32B 3/30 428/147 |
| 2014/0329062 | A1* | 11/2014 | Song | B32B 3/26 428/201 |
| 2015/0267025 | A1* | 9/2015 | Fang | B32B 3/26 428/318.6 |
| 2016/0001527 | A1* | 1/2016 | Jiangang | B32B 27/40 428/215 |
| 2016/0167350 | A1* | 6/2016 | Kong | B32B 27/304 428/71 |
| 2016/0177579 | A1* | 6/2016 | Fang | B32B 27/08 428/317.9 |
| 2016/0281367 | A1* | 9/2016 | Jiang | B29B 7/88 |
| 2017/0136735 | A1* | 5/2017 | Chen | B32B 7/04 |
| 2017/0144418 | A1* | 5/2017 | Chen | B32B 27/304 |
| 2018/0099594 | A1* | 4/2018 | Min | B32B 27/06 |

FOREIGN PATENT DOCUMENTS

| | | | | |
|---|---|---|---|---|
| WO | WO 2014028943 A1 * | 2/2014 | | C08J 5/18 |
| WO | WO 2015106095 A1 * | 7/2015 | | B32B 27/22 |

OTHER PUBLICATIONS

Definition of the term elastomer from the Oxford English Dictionatry, retrieved on Jun. 16, 2017.*

Minguez-Alarcon et al., Urinary concentrations of cyclohexane-1,2-dicarboxylic acid monohydroxy isononyl ester, a metabolite of the non-phthalate plasticizer di(isononyl)cyclohexane-1,2-dicarboxylate (DINCH), and markers of ovarian response among women attending a fertility center, Environmental Research, 151, 2016, 595-600.*

New Safety Law Doesn't Mean All's Well in Toyland, NPR, published on Feb. 12, 2009, retrieved on Jun. 16, 2017.*

Opinion of the Scientific Panel on food additives, flabourings, processing aids and materials in contact with food; The EFSA Journal, 2006, 395-401, 1-21.*

Chapter on Polyhydroxyalkanoate, Bhubalan et al, from Biodegradable Polymers in Clinical Use and Clinical Development, Wiely, 2011, p. 264-265.*

* cited by examiner

PVC BOARD AND METHOD OF MANUFACTURE

RELATED APPLICATIONS

This application is a non-provisional application of Chinese Patent Application No. 201510868205.6 filed Dec. 3, 2015, the disclosure of which is incorporated herein by reference in its entirety.

FIELD OF THE INVENTION

The present invention belongs to the technical field of engineered panels as building materials, and more particularly to a new type of PVC board and a simple method of manufacture.

BACKGROUND OF THE INVENTION

Polyvinyl chloride (PVC) is a well-known synthetic polymer. PVC has many qualities that make it a desirable building material. For example, it can be manufactured to be rigid or with a range of flexibility, it is resistant to moisture and mildew, waterproof and easily washable, and it is very durable. Rigid PVC is commonly used in construction for piping, doors and windows, and other applications where it replaces wood, metal, and other rigid materials. In the prior art, PVC is made flexible by adding plasticizers to the mixture of PVC components during manufacture. The most widely used plasticizers are phthalates, (which recent research has determined are toxic). In its flexible form, PVC is used in electrical cable insulation, imitation leather, signage, and other applications where it can take the place of rubber, leather, and other non-rigid materials. PVC is also resistant to impacts, aging, cracking, warping, and discoloration.

Because of its desirable characteristics, PVC has many commercial uses. For example, sheets of PVC are used as a flooring material, interior paneling, and exterior siding. As a flooring material, PVC is comfortable to walk on, and can have a very durable surface layer that resists slipping, even when wet. It can be produced to have a rich variety of colors, designs, and simulations of other materials. For example, PVC flooring is available that is similar in appearance to carpet, stone, wood, and tile, including a surface that can be embossed to enhance the realism of the simulation. The surface may alternatively be made flat, with a rough, matte, or glossy finish. PVC sheets can also be manufactured to have one or more visible design layers to achieve various effects, using a very broad palette of colors in virtually any hue, saturation, and tone from muted to brilliant. Adjacent contrasting areas can be formed and/or machined to have very precisely controlled shapes and colors.

Because of all of these traits, PVC board is superior to other common construction materials, particularly inside wall paneling and flooring material, and can give full play to designer creativity. It can meet the unique needs of virtually any decor. In addition, PVC can be made to be sound absorbent, reducing ambient noise by as much as 20 decibels; and can be made to mitigate noise from percussion events such as walking in high heels. This makes PVC particularly suited to quiet environments such as hospitals, libraries, lecture halls, theaters, and the like.

Moreover, PVC is easy to work with. As a wood replacement, it can be worked like wood by drilling, sawing, nailing, planing, gluing, and other processing; and it provides similar performance, such as nail holding power. Products made of PVC are also normally at least as easy to install as those made with other materials. It is strong and light, and parts with mating connections can easily be assembled with adhesive made for bonding PVC and, in a relatively short time, the bond is as strong as the PVC body.

However, PVC production in the prior art is complicated. It requires a large number of processing steps, all of which must be tightly controlled and performed in a set order. For example, producing PVC boards generally involves mixing together in separate steps PVC powder, plasticizers, stabilizers, lubricants, fillers, and other raw materials. At each step, the materials must be completely and uniformly mixed to produce a consistent mixture. After the PVC material is produced, forming it into finished products typically entails first making sheets of PVC. This also requires numerous ordered steps, involving rolling semi-finished product into component sheets, combining the sheets in one or more separate processes resulting in a finished sheet that has many layers, and processing the layered sheets into finished products. If the layers are not firmly affixed to each other, they may separate, bubble, crack, or otherwise be of a lesser quality than desired.

Existing PVC production methods generally include separate steps for mixing, stabilizing, sealing, curing, tempering, coating, laminating, and more. Combining and mixing constituent raw materials, such as PVC powder, plasticizers, stabilizers, lubricants, fillers and others, typically must be added in a certain order. Products having layers with different characteristics require each layer to be mixed separately from the others. Each such layer may be milled into an intermediate stage by rolling the PVC into sheets, and the sheets must then be combined in a certain order, and fused together into a combined sheet, often by one or more heating steps. The combined sheet is then typically cut to shape and molded to form if needed. The PVC may be cured under ultraviolet light, and may be tempered by a plurality of heating, stretching, and cooling steps. In some applications, the PVC must also be laminated. Further steps can include forming designs or patterns on one or more layers, texturing one or more surfaces, and the like. Thus, the PVC manufacturing process is quite complex.

SUMMARY OF THE INVENTION

A novel PVC board and method of manufacture. The board includes a non-toxic flexible PVC impact modifier agent instead of plasticizers to provide resilient flooring with excellent performance characteristics. The method of manufacture simplifies the production process, and improves production time and efficiency.

BRIEF DESCRIPTION OF THE DRAWINGS

The particular features and advantages of the invention as well as other objects will become apparent from the following description taken in connection with the accompanying drawings in which.

DETAILED DESCRIPTION

Figure 1:
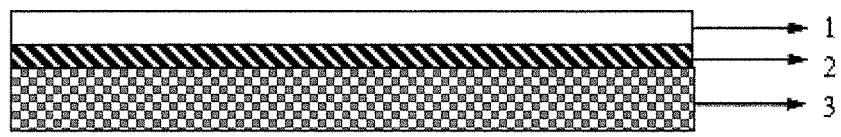
FIG. 1 is a side view of an exemplary engineered board according to the invention.

A new PVC board and a method of manufacture are disclosed and described. In a currently preferred embodiment, the PVC board is a composite with three layers. As shown in FIG. 1, the layers from top to bottom are 1) an impact resistant, transparent PVC wear layer; 2) a PVC film layer visible through the transparent wear layer that displays one or more colors, shapes, patterns, and/or simulations of other materials; and 3) a PVC bottom, or base, layer that contains a flexible PVC impact modifier. The wear layer may be provided with various finishes, including smooth, matte, textured, or embossed. The base layer may be a solid or foam layer of PVC, and may also be provided with a bottom surface treatment such as embossing, for example, to support ease of installation using adhesives.

In the case the base layer is solid, it comprises by weight: 100 parts of polyvinyl chloride (PVC) resin, 4-20 parts of PVC elastomeric impact modifier, 0-400 parts of calcium carbonate, 6-8 parts of calcium/zinc compound stabilizing agent, and 1.0-2.0 parts lubricant.

In the case the base layer is foam, it comprises by weight: 100 parts of PVC resin, 4-20 parts of PVC elastomeric impact modifier, 0-300 parts of calcium carbonate, 6-8 parts of calcium/zinc compound stabilizing agent, 0.2-1.0 parts foaming agent, 4-8 parts foaming regulator, and 1.0-2.0 parts lubricant.

In addition, a novel method for producing a multi-layered composite sheet of PVC is disclosed and described. In an exemplary embodiment, the method produces a composite sheet having three layers permanently fused together. The three layers include a bottom PVC base layer which may be either a solid layer or a foam layer in accordance with one of the above formulas. A PVC presentation layer is formed adjacent to the base and fused permanently to the base layer, providing one or more colors, shapes, designs, and/or visual simulations of other materials such as wood, tile, etc. The third layer is an impact resistant transparent PVC wear layer through which the display layer is visible. It is formed adjacent to the display layer and fused permanently to the display layer. In embodiments, the wear layer may be provided with a desired finish, which may be smooth, matte, rough, textured, grooved, or embossed to simulate the surface of a material visually simulated by the display layer to which it is fused.

Figure 2A:
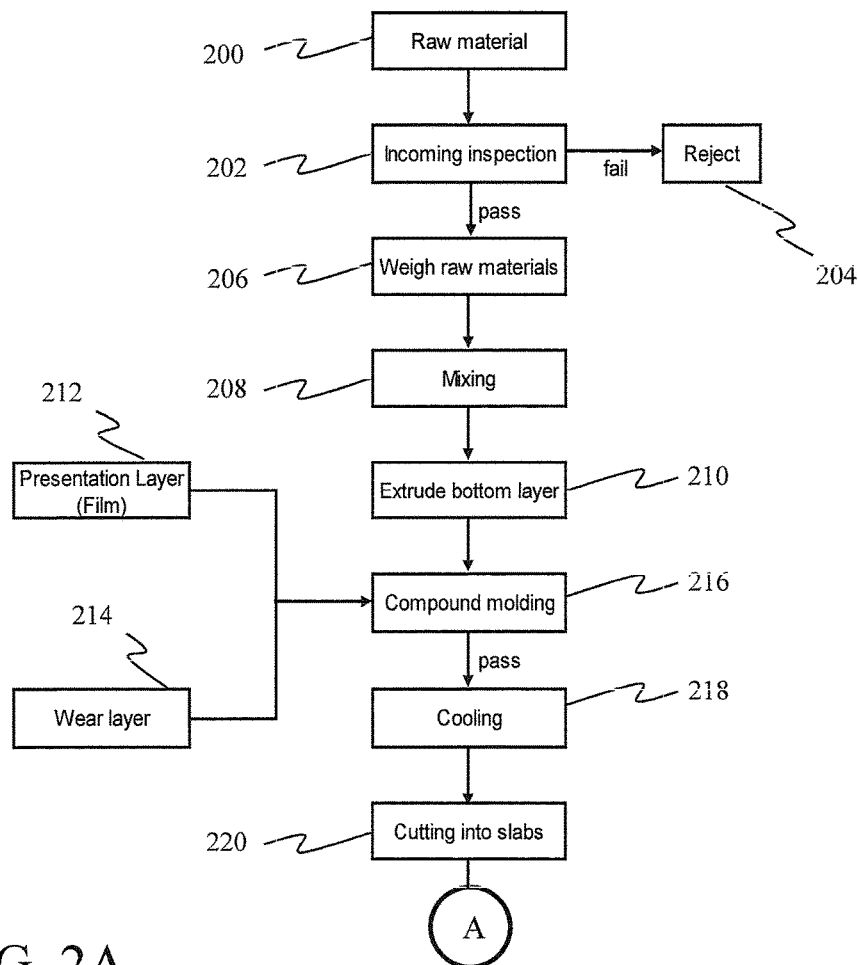
FIGS. 2A-2B are a flow diagram of a method of manufacturing the board of FIG. 1, according to the invention.
Figure 2B:
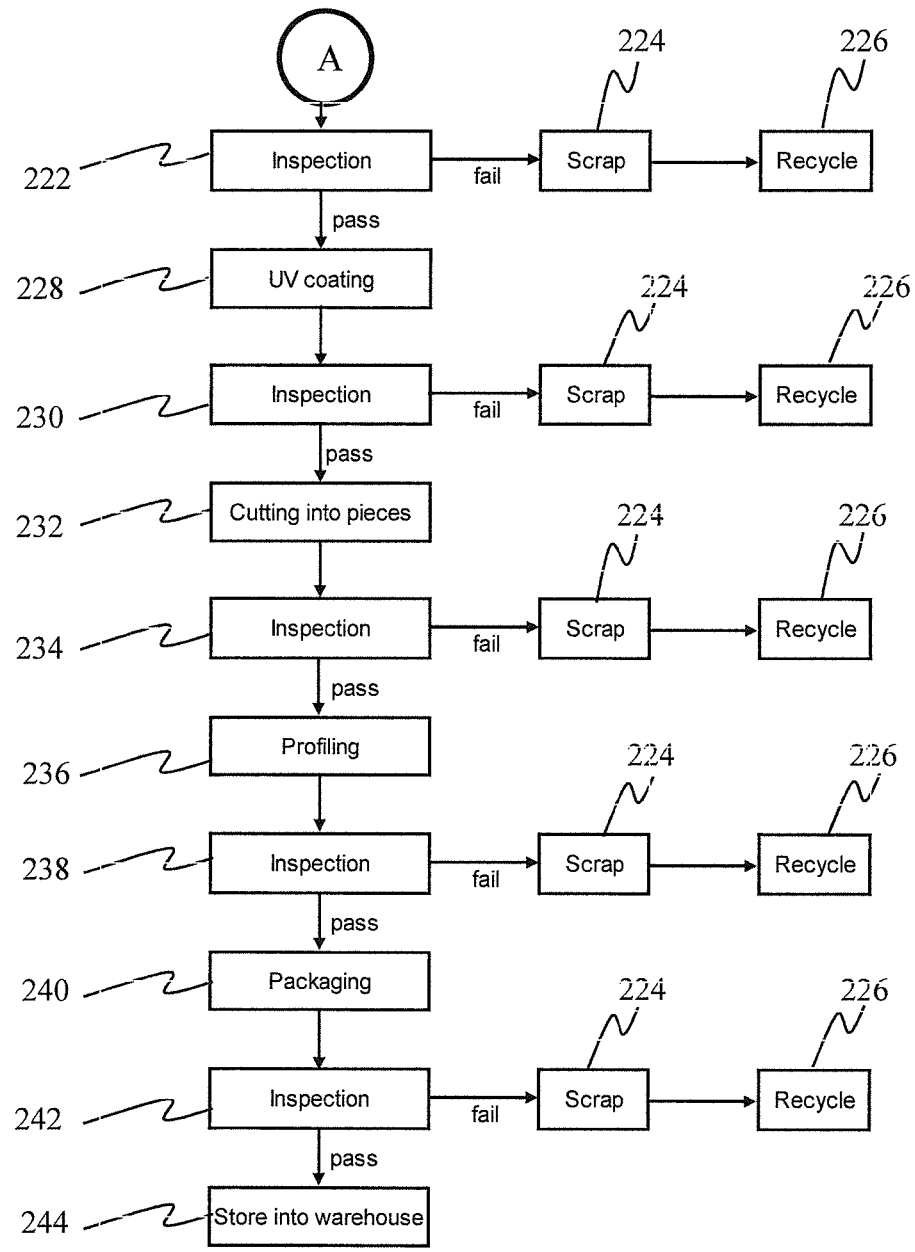

FIGS. 2A-2B are a flow diagram showing an exemplary embodiment of the method of forming a composite PVC board. As shown, the method begins by receiving the raw material, 200, from which the PVC board will be made. The raw material is inspected, 202, and if it fails inspection it is rejected, 204. If the raw material passes the incoming inspection, the parts by weight specified in at least one of the formulas above are weighed, 206, and placed into a mixer for mixing, 208. Preferably, during mixing in the mixer the materials are heated to a temperature at which they can flow to facilitate forming a homogeneous mixture, then cooled until viscous and ductile. In an embodiment, the PVC mixture is heated to between 100-130° C., and preferably to 110-120° C. The mixture is then cooled to a reduced temperature while continuing to stir, until the mixture is in a viscous ductile state. In an embodiment, the heated mixture is cooled to between 30-50° C., and preferably to 35-45° C., and more preferably to about 40° C. Next, the cooled ductile material for the PVC base layer is extruded into a flat, uniform sheet, 210, preferably onto a surface that moves relative to the extruder. A twin screw extruder may be used, preferably maintained at a temperature in the range of 150° C.-180° C.

Similar processes (not shown) are also performed for the PVC film layer, 212, and for the transparent PVC wear layer, 214. The processing of all three layers is coordinated so they are processed separately but during the same manufacturing process. Then, the three ductile layers are molded together, 216, which permanently fuses the layers together into a thin sheet of compound layered material. Alternatively, the ductile product may be molded into a desired profile. The sheet is then further cooled, 218. The compound sheet is then cut into slabs, 220. FIG. 2A merges into FIG. 2B by matching the circled "A" at the bottom of 2A with the circled "A" at the top of FIG. 2B.

Referring now to FIG. 2B, after cutting, the slabs of compound material are inspected, 222. For example, they may be inspected to check the uniformity of the material in terms of physical properties such as thickness, transparency of the top layer, appearance of the film layer, flexibility, and/or compressibility provided by the base layer, for example. If a slab fails the inspection, it may be scrapped, 224, and recycled, 226. For example, the material may be shredded or pelletized and used as a component of a subsequently manufactured product that can use the mixture of raw materials by weight that make up the scrapped material. The material may be inspected again after one or more subsequent manufacturing stages, and material that fails those inspections may be similarly scrapped, 224, and recycled, 226.

In an embodiment, the slabs that pass the inspection are provided with an ultraviolet (UV) coating, 228, which may be sprayed onto the slabs, for example, and cured under UV light. The coated slabs may then be inspected again, 230. Materials that fail inspection may be scrapped, 224, and recycled, 226, as before. The coated slabs that pass inspection may then be cut into the pieces that will make up the finished product, 232, and inspected again, 234. Materials that fail inspection may be scrapped, 224, and recycled, 226, as before.

In an embodiment, the pieces that pass the inspection may be finished, such as by machining one or more edges and/or surfaces of the pieces, for example. The finished pieces may then be inspected again, 238. Materials that fail inspection may be scrapped, 224, and recycled, 226, as before. The finished pieces that pass inspection constitute the finished product. These may be packaged, 240, and inspected again, 242. Materials that fail inspection may be scrapped, 224, and recycled, 226, as before. Finally, the packaged finished pieces that pass this final inspection may be stored in a warehouse, 244, or otherwise prepared for shipping.

In summary, an embodiment is described above in which a PVC flooring material is manufactured simply and efficiently, with only three layers and in a single production line. The PVC material of each of the three layers is mixed, heated, and cooled separately from the others. The layers are then extruded in separate extruders one on top of the other in a single processing step while they are all in a hot viscous state. The extruders may be twin screw extruders, maintained at a constant hot temperature to maintain the ductile state of each layer so that it fuses to the adjacent layers.

In an embodiment, the layers are extruded onto a moving surface of a single production path, for example onto a rotating drum. The base layer may be extruded and fed into a first set of hot rollers, flattening it into a thin sheet. The second, presentation layer may be extruded onto or adjacent to the still-ductile base layer as it moves along the production path. Because of their hot ductile state when the two sheets meet, they fuse together permanently forming a two-layer composite sheet. In an embodiment, another set of rollers may further flatten and fuse the two-layer composite sheet. Finally, the wear layer material may be extruded onto or adjacent to the presentation layer. Again, because of the hot ductile state of the wear layer and the presentation layer when they meet, the two sheets fuse together permanently, forming a three-layer composite sheet. In an embodiment, the three layers can be joined in a single step by feeding them from three different directions at the same velocity, e.g., from left, right, and directly above. The three extruded sheets may then be rolled together and fused. In another embodiment, a different set of rollers may introduce each of the three layers into the production path. For example, the base layer may be extruded first, then the presentation layer can be extruded atop the base layer, forming a two-layer composite. The two-layer composite may be fed into a set of rollers to flatten and fuse them together. Or, the wear layer may be extruded onto the presentation layer forming a three-layer composite sheet, with the wear layer on top. The three-layer composite may then be passed through another set of rollers to flatten and fuse the layers together. In either case, all three layers are thus flattened and permanently fused to each other in a single production path.

In embodiments, heating the three mixtures of PVC materials involves separately heating each mixture to between 100-130° C., and preferably to 110-120° C. The mixtures are then cooled to a reduced temperature while continuing to stir, until they are in a viscous ductile state. In an embodiment, each of the stirring mixtures is cooled to between 30-50° C., and preferably to 35-45° C., and more preferably to about 40° C. At this temperature each material thickens into a viscous ductile state. This ductile material is then fed into a twin screw extruder before being fed into rollers as described above.

In embodiments, a composite sheet or panel may be formed as described above, but with additional processing steps. Such steps may be performed as the material moves through the production line, still within a single production process. Such processing steps may include, for example, tempering the composite material by one or more additional heating-cooling steps, and/or pulling and stretching steps, at any appropriate point in the production line. The composite may also be cut, molded, pressed, profiled, planed, polished, and/or otherwise machined, to form any desired profile or other desired solid or hollow shape.

Although composite sheets with three distinct layers have been described, the form of the finished product does not need to be a sheet, and it does not need to have three layers. Instead, any number of layers can be formed into any number of shapes by including the needed steps in the manufacturing process. Nevertheless, the currently preferred embodiment produces a flat PVC panel having three layers suitable for use as a flooring material, as described.

In the foregoing PVC mixture descriptions, it is emphasized that a non-toxic impact modifier is used to provide shock absorbency instead of a plasticizer. This can result in a more resilient floor that provides better environmental performance. By the above method, after cooling and molding the composite PVC panel, it may be cut to form large wall or floor panels.

Numerous alterations of the structure herein disclosed will suggest themselves to those skilled in the art. However, the present disclosure relates to embodiments of the invention that are described for purposes of illustration only. The described embodiments are not to be construed as limiting the invention unless the limitation is specifically noted as such in the disclosure. Modifications which do not depart from the spirit of the invention are intended to be included within the invention, the scope of which is defined in the appended claims.

What is claimed is:

1. A polyvinyl chloride (PVC) board comprising:
a transparent wear layer as a top layer;
a PVC film as a presentation layer, permanently coupled to the top layer; and
a base PVC layer permanently coupled to the presentation layer, the base PVC layer containing a compressible elastomeric impact modifier;
wherein the PVC board contains no plasticizer; and
wherein the base layer is a foam formed from a PVC mixture comprising by weight:
100 parts polyvinyl chloride resin,
4-20 parts compressible elastomeric impact modifier,
150-300 parts calcium carbonate,
6-8 parts calcium/zinc stabilizing compound,
0.2-1.0 parts foaming agent,
4-8 parts foaming regulator, and
1.0-2.0 parts lubricant.

2. The PVC board of claim 1, wherein the top layer is finished with a surface that is glossy, matte, or rough.

3. The PVC board of claim 1, wherein the base layer is embossed with a uniform geometric pattern.

4. The PVC board of claim 1, wherein:
the presentation layer simulates the appearance of a building material that is not PVC,
the top layer is embossed with a texture simulating the texture of the building material simulated by the presentation layer.

5. A polyvinyl chloride (PVC) board comprising:
a transparent wear layer as a top layer;
a PVC film as a presentation layer, permanently coupled to the top layer; and
a base PVC layer permanently coupled to the presentation layer, the base PVC layer containing a compressible elastomeric impact modifier;
wherein the PVC board contains no plasticizer; and
wherein the base layer is a foam formed from a PVC mixture consisting of, by weight:
100 parts polyvinyl chloride resin,
4-20 parts compressible elastomeric impact modifier,
150-300 parts calcium carbonate,
6-8 parts calcium/zinc stabilizing compound,
0.2-1.0 parts foaming agent,
4-8 parts foaming regulator, and
1.0-2.0 parts lubricant.

6. A method of manufacturing the PVC board according to claim 1 comprising:
forming a three-layer PVC composite, including:
forming the base PVC layer;
forming the presentation layer and permanently fusing it to the base layer; and
forming the wear layer and permanently fusing it to the presentation layer;
processing the three-layer PVC composite to form the PVC board.

7. The method of claim 6,
wherein the forming of the base PVC layer, the forming of the presentation layer, and the forming of the wear layer are each carried out by extrusion in an extruder.

8. The method of claim 6, further comprising:
hot rolling the PVC composite between a set of rollers that embosses the wear layer.

9. The method of claim 6, further comprising:
hot rolling the PVC composite between a set of rollers that embosses the base layer.

10. The method of claim 6, wherein the presentation layer is formed from a first sheet having a first visible design aligned in a first direction, and a second sheet having a second visible design aligned in a second direction different than the first direction.

11. The method of claim 6, wherein the presentation layer has an appearance that simulates the appearance of a material that is not PVC.

12. The method of claim 11, further comprising:
embossing the top layer to have a surface that simulates a surface of the genuine material that is simulated by the appearance of the presentation layer.

13. The method of claim 6, further comprising:
before forming the three layers, mixing raw materials including a PVC component for each layer in a respective mixer to form three separate PVC mixtures;
heating and stirring each of the PVC mixtures until it is a homogeneous hot PVC mixture;
cooling the hot PVC mixture to a predetermined temperature until it has a predetermined target viscosity; and
extruding the cooled viscous PVC through a twin screw PVC extruder to form a respective layer.

14. The method of claim 13, wherein:
each of the three PVC mixtures is heated in their respective mixer to 110-120° C. to form the hot PVC mixture; and
each of the hot PVC mixtures is cooled in their respective mixer to between 35-45° C. while stirring.

* * * * *